(12) United States Patent
Sato

(10) Patent No.: US 10,234,601 B2
(45) Date of Patent: Mar. 19, 2019

(54) SPECTACLE LENS

(71) Applicant: HOYA LENS THAILAND LTD., Patumthani (TH)

(72) Inventor: Daisuke Sato, Shinjuku-ku (JP)

(73) Assignee: HOYA LENS THAILAND LTD., Patumthani (TH)

( * ) Notice: Subject to any disclaimer, the term of this patent is extended or adjusted under 35 U.S.C. 154(b) by 0 days.

(21) Appl. No.: 15/306,461

(22) PCT Filed: Apr. 24, 2015

(86) PCT No.: PCT/JP2015/062597
§ 371 (c)(1),
(2) Date: Oct. 24, 2016

(87) PCT Pub. No.: WO2015/163464
PCT Pub. Date: Oct. 29, 2015

(65) Prior Publication Data
US 2017/0045646 A1 Feb. 16, 2017

(30) Foreign Application Priority Data
Apr. 24, 2014 (JP) .................................. 2014-090744

(51) Int. Cl.
| | | |
|---|---|---|
| G02B 1/14 | (2015.01) | |
| B32B 27/20 | (2006.01) | |
| B32B 27/38 | (2006.01) | |
| G02C 7/02 | (2006.01) | |
| B05D 1/00 | (2006.01) | |
| B05D 1/02 | (2006.01) | |
| B05D 1/18 | (2006.01) | |
| B05D 3/00 | (2006.01) | |
| C08J 7/04 | (2006.01) | |
| C09D 163/00 | (2006.01) | |
| C08K 3/36 | (2006.01) | |

(52) U.S. Cl.
CPC ............... *G02B 1/14* (2015.01); *B05D 1/005* (2013.01); *B05D 1/02* (2013.01); *B05D 1/18* (2013.01); *B05D 3/007* (2013.01); *B32B 27/20* (2013.01); *B32B 27/38* (2013.01); *C08J 7/042* (2013.01); *C09D 163/00* (2013.01); *G02C 7/02* (2013.01); *C08J 2463/00* (2013.01); *C08J 2483/04* (2013.01); *C08K 3/36* (2013.01); *G02C 2202/16* (2013.01)

(58) Field of Classification Search
CPC . G02B 1/14; B05D 1/005; B05D 1/02; B05D 1/18; B05D 3/007; B32B 27/20; B32B 27/38; C08J 7/042; C09D 163/00; G02C 7/02
USPC .................................................... 351/159.57
See application file for complete search history.

(56) References Cited

U.S. PATENT DOCUMENTS

| | | | |
|---|---|---|---|
| 4,525,421 A | 6/1985 | Kubota et al. | |
| 6,890,644 B2* | 5/2005 | Kayanoki | C08G 18/0823 |
| | | | 351/159.62 |
| 2008/0036964 A1* | 2/2008 | Miura | B29D 11/0073 |
| | | | 351/159.27 |
| 2008/0075848 A1* | 3/2008 | Kurata | B29D 11/00903 |
| | | | 427/164 |
| 2011/0085127 A1* | 4/2011 | Wada | G02C 7/027 |
| | | | 351/45 |
| 2017/0139084 A1* | 5/2017 | Shimada | B32B 27/20 |

FOREIGN PATENT DOCUMENTS

| | | |
|---|---|---|
| EP | 1647842 | 4/2006 |
| JP | H06340843 A | 12/1994 |
| JP | 07207190 A * | 8/1995 |
| JP | H08-34897 A | 2/1996 |
| JP | H11-92653 A | 4/1999 |
| JP | H11-92655 A | 4/1999 |
| JP | 2003-292882 A | 10/2003 |
| JP | 2004-013127 A | 1/2004 |
| JP | 3588375 B2 | 11/2004 |
| JP | 2006-139247 A | 6/2006 |
| JP | 2006-171163 A | 6/2006 |
| JP | 2006163106 A * | 6/2006 |
| JP | 2006-267469 A | 10/2006 |
| JP | 2007-9187 A | 1/2007 |
| JP | 2008-096886 A | 4/2008 |
| JP | 2009-217215 A | 9/2009 |
| JP | 2010-128420 A | 6/2010 |
| JP | 2014-048479 A | 3/2014 |

OTHER PUBLICATIONS

International Search Report and Written Opinion dated Jul. 7, 2015 for application PCT/JP2015/062597, filed on Apr. 24, 2015 and published as WO 2015/0163464 on Oct. 29, 2015 (Applicant—Hoya Lens Thailand Ltd. // Inventor—Sato) (6 pages).

Extended European Search Report dated Jul. 31, 2017 by the European Patent Office for EP Application No. 15783576.0, which was filed on Apr. 24, 2015 and published as EP 3136140 A1 on Mar. 1, 2017 (Applicant—Hoya Lens Thailand Ltd.) (6 pages).

First Office Action dated Jul. 25, 2017 by the SIPO for CN Application No. 201580021461, which was filed on Apr. 24, 2015 and published as CN 106233162 A on Dec. 14, 2016 (Applicant—Hoya Lens Thailand Ltd.) (Original—5 pages // Translated—7 pages).

\* cited by examiner

*Primary Examiner* — James Greece

(74) *Attorney, Agent, or Firm* — Kilpatrick Townsend & Stockton LLP

(57) ABSTRACT

A spectacle lens which can suppress the generation of cracks at the time of manufacture. The spectacle lens is a spectacle lens which includes a lens substrate and a hard coat layer and in which the hard coat layer is obtained by curing a curable composition containing inorganic oxide particles, a silane coupling agent, and a polyfunctional epoxy compound contained at more than 40% by mass and 60% by mass or less in a matrix component.

20 Claims, No Drawings

SPECTACLE LENS

CROSS-REFERENCE TO RELATED APPLICATIONS

This application is a U.S. National Phase Application of International Application No. PCT/JP2015/062597, filed Apr. 24, 2015, which claims priority to Japanese Patent Application No. 2014-090744, filed Apr. 24, 2014. The contents of these earlier filed applications are hereby incorporated by reference herein in their entirety.

TECHNICAL FIELD

The present disclosure relates to a spectacle lens having a hard coat layer.

BACKGROUND ART

Spectacle lenses are required to have various properties. Abrasion resistance, the property to be hardly scratched as a user uses the spectacle lens in daily life, is required. A hard coat layer is almost formed on spectacle lenses, particularly plastic spectacle lenses for the purpose of preventing scratches. Usually, the hard coat is deposited in a film thickness range of from 1 to 3 μm to impart abrasion resistance to the spectacle lens in usual use.

In Patent Literature 1, an optical article is disclosed which includes an optical substrate and a function layer laminated on the surface of the optical substrate and in which the functional layer includes a hard coat layer having a certain refractive index and the thickness T μm of the functional layer satisfies "9.1≤T≤100".

CITATION LIST

Patent Literature

Patent Literature 1: JP 2010-128420 A

SUMMARY

Technical Problem

According to the optical article described in Patent Literature 1, although it is possible to suppress the interference fringe and further to improve the abrasion resistance which has been hitherto said by using a functional layer including a hard coat layer, an optical member has hitherto had a problem that cracks are likely to be generated and the weather resistance is poor.

Accordingly, an aspect of the present disclosure is to provide a spectacle lens which can suppress the generation of cracks at the time of manufacture.

Solution to Problem

The present disclosure relates to the following spectacle lens.

[1] A spectacle lens including a lens substrate and a hard coat layer, in which the hard coat layer is obtained by curing a curable composition containing inorganic oxide particles, a silane coupling agent, and a polyfunctional epoxy compound contained at more than 40% by mass and 60% by mass or less in a matrix component.

[2] The spectacle lens according to [1], in which the hard coat layer has a film thickness of 10 μm or more and 50 μm or less.

[3] The spectacle lens according to [1] or [2], in which the inorganic oxide particles are silica particles.

[4] The spectacle lens according to anyone of [1] to [3], in which the silane coupling agent has an organic group bonded to a silicon atom and an alkoxy group bonded to a silicon atom.

[5] The spectacle lens according to anyone of [1] to [4], in which the polyfunctional epoxy compound has two or three epoxy groups.

[6] The spectacle lens according to anyone of [1] to [5], further including an interference fringe suppressing layer between the lens substrate and the hard coat layer.

Advantageous Effects

According to the present disclosure, it is possible to provide a spectacle lens which can suppress the generation of cracks at the time of manufacture.

DESCRIPTION OF EMBODIMENTS

The spectacle lens of the present disclosure is a spectacle lens which includes a lens substrate and a hard coat layer and in which the hard coat layer is obtained by curing a curable composition containing inorganic oxide particles, a silane coupling agent, and a polyfunctional epoxy compound (hereinafter, simply referred to as the "epoxy compound") contained at more than 40% by mass and 60% by mass or less in a matrix component.

It is possible to suppress cracking at the time of manufacture as an epoxy compound is contained in the curable composition to be used in the formation of the hard coat layer in the above range. In addition, excellent weather resistance is also exhibited by the above configuration.

The film thickness of the hard coat layer may be 10 μm or more and 50 μm or less. As the film thickness is 10 μm or more and 50 μm or less, a high film peeling off load value, namely, high scratch resistance is exhibited and further a spectacle lens in which initial cracks are hardly generated is obtained. In addition, the film thickness of the hard coat layer may be 15 μm or more and may be 18 μm or more from the viewpoint of obtaining a spectacle lens having a high film peeling off load value. The film thickness may be 40 μm or less and may be 30 μm or less from the viewpoint of suppressing the generation of initial cracks. The "film thickness" means an average film thickness, and the measuring method thereof is described in Examples.

The content of the epoxy compound in the curable composition to be used in the formation of the hard coat layer is more than 40% by mass and may be 45% by mass or more in the matrix component from the viewpoint of suppressing the generation of initial cracks and high weather resistance. The content of the epoxy compound is 60% by mass or less and may be 55% by mass or less in the matrix component from the viewpoint of maintaining the hardness of the hard coat film. In the present disclosure, the matrix component means a silane coupling agent and a polyfunctional epoxy compound. As a polyfunctional epoxy compound is added, suppression of the hydrolysis the hard coat layer and a decrease in stress are expected against cracking or peeling off occurred due to the time dependent deterioration (decomposition of bonding caused by moisture or ultraviolet light, or the like) of the hard coat in the prior art and cracking due to the stress caused by the cure heat at the time of deposition of the hard coat. It is possible to impart proper bonding and flexibility to the hard coat layer, and thus it is possible to improve the water resistance and ultraviolet resistance.

Hereinafter, the configuration of the spectacle lens of the present disclosure will be described in detail.

(Lens Substrate)

Examples of the material to be used in the lens substrate of a spectacle lens may include plastics such as a polyurethane-based material (for example, polyurethane, polyurethane urea, polythiourethane), polycarbonate, and diethylene glycol-bis-allyl-carbonate and inorganic glass. The thickness and diameter of the lens substrate are not particularly limited. Usually, the thickness is about from 1 to 30 mm and the diameter is about from 50 to 100 mm. In a case in which the spectacle lens of the present disclosure is a spectacle lens for vision correction, it is usual to use those having a refractive index ne of about from 1.5 to 1.8 as the lens substrate. Colorless ones are usually used as the lens substrate, but it is also possible to use colored ones as long as the transparency is not impaired. In addition, the surface shape of the substrate on which a cured film is formed is not particularly limited, and it can be an arbitrary shape such as a flat shape, a convex shape, or a concave shape.

[Functional Layer]

In the spectacle lens of the present disclosure, the lens substrate is provided with a functional layer including at least a hard coat layer. Examples of other functional layers may include a primer layer, an interference fringe suppressing layer, a polarizing layer, and a photochromic layer. In addition, it is also possible to further provide functional layers such as an antireflection layer, a water repellent film, an ultraviolet absorbing film, an infrared absorbing film, a photochromic film, and an antistatic film on the hard coat layer if necessary. With regard to functional layers other than these, known techniques related to spectacle lenses can be applied.

The hard coat layer may be directly formed on the lens substrate surface, or it may be indirectly formed thereon via one or more other functional layers.

In the spectacle lens of the present disclosure, it is possible to laminate the primer layer and the hard coat layer in this order from the substrate side or to laminate the interference fringe suppressing layer and the hard coat layer in this order from the substrate side. In another embodiment it is also possible to laminate the interference fringe suppressing layer, the primer layer, and the hard coat layer in this order from the substrate side. In yet another embodiment it is possible to laminate the interference fringe suppressing layer, the primer layer, the hard coat layer, and the antireflection layer in this order from the substrate side.

(Hard Coat Layer)

The hard coat layer is obtained, for example, by curing a curable composition containing inorganic oxide particles (hereinafter, referred to as the "component (A)"), a silane coupling agent (hereinafter, referred to as the "component (B)"), and a polyfunctional epoxy compound (hereinafter, referred to as the "component (C)").

Examples of the component (A) may include particles of tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), antimony oxide ($Sb_2O_5$), and the like, and the component (A) may be silicon oxide. These metal oxide particles may be used singly or two or more kinds thereof may be concurrently used. In addition, it is also possible to use composite oxide particles of two or more kinds of inorganic oxides. The particle size of the inorganic oxide particles is preferably in a range of from 5 to 30 nm from the viewpoint of achieving both abrasion resistance and optical properties. Among these inorganic oxide particles, silica particles may be from the viewpoint of suppressing cracking at the time of manufacture and obtaining a spectacle lens exhibiting excellent weather resistance.

The component (B) is a silane coupling agent, and may be a silane coupling agent having an organic group bonded to a silicon atom and a hydrolyzable group.

Examples of the hydrolyzable group may include an alkoxy group, an aryloxy group, and a hydroxyl group, and the hydrolyzable group may be an alkoxy group.

The silane coupling agent may be an organic silicon compound represented by the following general formula (I) or a hydrolysate thereof.

$$(R^1)_a(R^3)_b Si(OR^2)_{4-(a+b)} \qquad (I)$$

In the general formula (I), a is 1 and b is 0 or 1.

$R^1$ represents an organic group having a functional group such as an epoxy group such as a glycidoxy group, a vinyl group, a methacryloxy group, an acryloxy group, a mercapto group, an amino group, or a phenyl group. In some embodiments, $R^1$ represents an organic group having an epoxy group. The functional group may be directly bonded to a silicon atom or indirectly bonded thereto via a linking group such as an alkylene group.

$R^2$ represents, for example, a hydrogen atom, an alkyl group, an acyl group, or an aryl group. In some embodiments $R^2$ represents an alkyl group.

The alkyl group represented by $R^2$ is, for example, a straight-chain or branched alkyl group having from 1 to 4 carbon atoms, and specific examples thereof may include a methyl group, an ethyl group, a propyl group, and a butyl group, and may be the alkyl group is a methyl group or an ethyl group.

The acyl group represented by $R^2$ is, for example, an acyl group having from 1 to 4 carbon atoms, and specific examples thereof may include an acetyl group, a propionyl group, an oleyl group, and a benzoyl group.

The aryl group represented by $R^2$ is, for example, an aryl group having from 6 to 10 carbon atoms, and specific examples thereof may include a phenyl group, a xylyl group, and a tolyl group.

$R^3$ can be an alkyl group or an aryl group.

The alkyl group represented by $R^3$ is, for example, a straight-chain or branched alkyl group having from 1 to 6 carbon atoms, and specific examples thereof may include a methyl group, an ethyl group, a propyl group, a butyl group, a pentyl group, and a hexyl group.

The aryl group represented by $R^3$ is, for example, an aryl group having from 6 to 10 carbon atoms, and specific examples thereof may include a phenyl group, a xylyl group, and a tolyl group.

Specific examples of the component (B) may include glycidoxymethyltrimethoxysilane,
glycidoxymethyltriethoxysilane,
α-glycidoxyethyltriethoxysilane,
β-glycidoxyethyltrimethoxysilane,
β-glycidoxyethyltriethoxysilane,
α-glycidoxypropyltrimethoxysilane,
α-glycidoxypropyltriethoxysilane,
β-glycidoxypropyltrimethoxysilane,
β-glycidoxypropyltriethoxysilane,
γ-glycidoxypropyltrimethoxysilane,
γ-glycidoxypropyltriethoxysilane,
γ-glycidoxypropyltripropoxysilane,
γ-glycidoxypropyltributoxysilane, γ-glycidoxypropyltriphenoxysilane,
α-glycidoxybutyltrimethoxysilane,
α-glycidoxybutyltriethoxysilane,
β-glycidoxybutyltrimethoxysilane,
β-glycidoxybutyltriethoxysilane,
γ-glycidoxybutyltrimethoxysilane,
γ-glycidoxybutyltriethoxysilane,
δ-glycidoxybutyltrimethoxysilane,
δ-glycidoxybutyltriethoxysilane,
(3,4-epoxycyclohexyl)methyltrimethoxysilane,
(3,4-epoxycyclohexyl)methyltriethoxysilane,
β-(3,4-epoxycyclohexyl)ethyltrimethoxysilane,
β-(3,4-epoxycyclohexyl)ethyltriethoxysilane,
β-(3,4-epoxycyclohexyl)ethyltripropoxysilane,
β-(3,4-epoxycyclohexyl)ethyltributoxysilane,
β-(3,4-epoxycyclohexyl)ethyltriphenoxysilane,
γ-(3,4-epoxycyclohexyl)propyltrimethoxysilane,
γ-(3,4-epoxycyclohexyl)propyltriethoxysilane,
δ-(3,4-epoxycyclohexyl)butyltrimethoxysilane,
δ-(3,4-epoxycyclohexyl)butyltriethoxysilane,
glycidoxymethylmethyldimethoxysilane,
glycidoxymethylmethyldiethoxysilane,
α-glycidoxyethylmethyldimethoxysilane,
α-glycidoxyethylmethyldiethoxysilane,
β-glycidoxyethylmethyldimethoxysilane,
β-glycidoxyethylmethyldiethoxysilane,
α-glycidoxypropylmethyldimethoxysilane,
α-glycidoxypropylmethyldiethoxysilane,
β-glycidoxypropylmethyldimethoxysilane,
β-glycidoxypropylmethyldiethoxysilane,
γ-glycidoxypropylmethyldimethoxysilane,
γ-glycidoxypropylmethyldiethoxysilane,
γ-glycidoxypropylmethyldipropoxysilane,
γ-glycidoxypropylmethyldibutoxysilane,
γ-glycidoxypropylmethyldiphenoxysilane,
γ-glycidoxypropylethyldimethoxysilane,
γ-glycidoxypropylethyldiethoxysilane,
γ-lycidoxypropylvinyldimethoxysilane,
γ-glycidoxypropylvinyldiethoxysilane,
γ-glycidoxypropylphenyldimethoxysilane,
γ-glycidoxypropylphenyldiethoxysilane,
vinyltrimethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)-γ-aminopropyltrimethoxysilane, N-(β-aminoethyl)-γ-aminopropylmethyldimethoxysilane, γ-aminopropylmethyldimethoxysilane, N-(β-aminoethyl)-γ-aminopropyltriethoxysilane, N-(β-aminoethyl)-γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptopropylmethyldiethoxysilane, methylvinyldimethoxysilane, and methylvinyldiethoxysilane.

Examples of the commercially available silane coupling agent may include the KBM-303, KBM-402, KBM-403, KBE402, KBE403, KBM-1403, KBM-502, KBM-503, KBE-502, KBE-503, KBM-5103, KBM-602, KBM-603, KBM-903, KBE-903, KBE-9103, KBM-573, KBM-575, KBM-9659, KBE-585, KBM-802, KBM-803, KBE-846, and KBE-9007 of trade names manufactured by Shin-Etsu Chemical Co., Ltd.

The component (C) is a polyfunctional epoxy compound having two or more epoxy groups in one molecule, and preferably it is a polyfunctional epoxy compound having two or three epoxy groups in one molecule. The film is soft possibly due to weak bonding when only a monofunctional or bifunctional epoxy compound is used and the film tends to be too hard in contrast when only a tetrafunctional epoxy compound is used, and thus it is more preferable to appropriately adjust the hardness by using a trifunctional epoxy compound or concurrently using a trifunctional epoxy compound and a bifunctional or tetrafunctional epoxy compound.

Specific examples of the component (C) may include aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentyl glycol diglycidyl ether, diglycidyl ether of neopentyl glycol hydroxypivalate, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerythritol diglycidyl ether, pentaerythritol triglycidyl ether, pentaerythritol tetraglycidyl ether, dipentaerythritol tetraglycidyl ether, sorbitol tetraglycidyl ether, diglycidyl ether of tris(2-hydroxyethyl) isocyanurate, and triglycidyl ether of tris(2-hydroxyethyl) isocyanurate, alicyclic epoxy compounds such as isophorone diol diglycidyl ether and bis-2,2-hydroxycyclohexylpropane diglycidyl ether, and aromatic epoxy compounds such as resorcinol diglycidyl ether, bisphenol A diglycidyl ether, bisphenol F diglycidyl ether, bisphenol S diglycidyl ether, orthophthalic acid diglycidyl ester, phenol novolac polyglycidyl ether, and cresol novolac polyglycidyl ether. As the component (C), a compound having two or three epoxy groups (bifunctional or trifunctional epoxy compound) is more preferable from the viewpoint of weather resistance of the spectacle lens manufactured.

Examples of the commercially available polyfunctional epoxy compound may include the EX-201, EX-211, EX-212, EX-252, EX-313, EX-314, EX-321, EX-411, EX-421, EX-512, EX-521, EX-611, EX-612, EX-614, and EX-614B of "DENACOL" series of a trade name manufactured by Nagase ChemteX Corporation.

The curable composition is one that contains the components (A) to (C) described above, and it can be prepared by mixing optional components such as an organic solvent, a surfactant (leveling agent), and a curing catalyst with the above components if necessary.

The content of the component (A) may be 20% by mass or more, 30% by mass or more, or 40% by mass or more in the solid of the curable composition. The content of the component (A) may be 80% by mass or less, 70% by mass or less, or 60% by mass or less in the solid of the curable composition.

The content of the component (B) may be 5% by mass or more, 10% by mass or more, or 15% by mass or more in the solid of the curable composition. The content of the component (B) may be 60% by mass or less, 50% by mass or less, or 40% by mass or less in the solid of the curable composition.

The content of the component (C) may be 10% by mass or more, 20% by mass or more, or 23% by mass or more in the solid of the curable composition. The content of the component (C) may be 60% by mass or less, 40% by mass or less, or 30% by mass or less in the solid of the curable composition.

The filler/matrix ratio (hereinafter, also simply referred to as the "F/M ratio") may be 0.2 or more, 0.4 or more, or 0.7 or more, and it may be 2.0 or less, 1.6 or less, or 1.4 or less.

Incidentally, the F/M ratio means the mass ratio [component (A)/(component (B)+component (C))] of the component (A) to the total mass of the component (B) and the component (C).

The hard coat layer can be formed by coating a plastic lens substrate with the curable composition and subjecting the coated curable composition to a curing treatment (heat curing, photocuring, or the like) in accordance with the curable group. As the coating means of the curable composition, it is possible to apply a method that is usually used such as a dipping method, a spin coating method, a spray method. The curing treatment is usually conducted by heating. The curing treatment by heating can be conducted, for example, by placing a lens coated with the curable composition in an environment having an ambient temperature of from 50 to 150° C. for about 30 minutes to 3 hours. On the other hand, the irradiation light for the curing treatment is, for example, an electron beam or ultraviolet light. The kind of irradiation light and the irradiation conditions are appropriately selected depending on the kind of component (C). Generally, it is possible to form a hard coat layer which has a high strength and contributes to the improvement of abrasion resistance of the lens by irradiating the curable composition with ultraviolet light at an irradiation light dose of about from 500 to 2000 mJ/cm$^2$.

(Primer Layer)

The primer layer is, for example, an aqueous resin layer formed from an aqueous resin composition containing a resin component and an aqueous solvent.

The aqueous solvent contained in the aqueous resin composition is, for example, water or a mixed solvent of water and a polar solvent or the like, and it is preferably water. The solid concentration in the aqueous resin composition may be from 1 to 60% by mass and may be from 5 to 40% by mass from the viewpoint of liquid stability and film-forming property. The aqueous resin composition can also contain additives such as an antioxidant, a dispersant, and a plasticizer if necessary in addition to the resin component. In addition, a commercially available aqueous resin composition may be used by being diluted with a solvent such as water, an alcohol, or propylene glycol monomethyl ether (PGM).

The aqueous resin composition can contain resin component in a state of being dissolved in an aqueous solvent or a state of being dispersed as fine particles (preferably colloidal particles). Among them, the aqueous resin composition is desirably a dispersion in which the resin component is dispersed in an aqueous solvent (preferably water) in the form of fine particles. In this case, the particle size of the resin component may be 0.3 μm or less from the viewpoint of dispersion stability of the composition. In addition, the pH of the aqueous resin composition is about from 5.5 to 9.0 at 25° C. from the viewpoint of stability. The viscosity of the aqueous resin composition may be from 5 to 500 mPa·s and may be from 10 to 50 mPa·s at 25° C. from the viewpoint of coating suitability. In addition, an aqueous resin composition having the following film properties in consideration of physical properties of the aqueous resin layer to be formed. The coating film obtained by coating a glass plate with the aqueous resin composition so as to have a thickness of 1 mm and drying this for 1 hour at 120° C. has a glass transition temperature Tg of from −58° C. to 7° C., a pencil hardness of from 4B to 2H, and a tensile strength measured in conformity to JISK 7113 of from 15 to 69 MPa.

Examples of the resin component of the aqueous resin composition may include at least one kind selected from a polyurethane resin, an acrylic resin, or an epoxy resin, and preferably the resin component is a polyurethane resin. The aqueous resin composition containing a polyurethane resin, namely, an aqueous polyurethane resin composition can be prepared, for example, by subjecting a high molecular weight polyol compound and an organic polyisocyanate compound to a urethanization reaction in a solvent that is inert to the reaction and exhibits great affinity for water together with a chain extender if necessary to obtain a prepolymer, neutralizing this prepolymer, and then dispersing the prepolymer in an aqueous solvent containing a chain extender to increase the molecular weight. For such an aqueous polyurethane resin composition and the preparation method thereof, it is possible to refer to, for example, paragraphs [0009] to [0013] in JP 3588375 B1, the paragraphs [0012] to [0021] in JP 8-34897 A, paragraphs [0010] to [0033] in JP 11-92653 A, and paragraphs [0010] to [0033] in JP 11-92655 A. In addition, as the aqueous polyurethane resin composition, it is also possible to use a commercially available waterborne urethane as it is or by diluting it with an aqueous solvent if necessary. As the commercially available waterborne polyurethane, for example, it is possible to use the "EVAFANOL" series manufactured by NICCA CHEMICAL CO., LTD., the "SUPERFLEX" series manufactured by DKS Co., Ltd., the "ADEKA BONTIGHTER" series manufactured by ADEKA CORPORATION, the "OLESTER" series manufactured by Mitsui Chemicals, Inc., the "VONDIC" series and "HYDRAN" series manufactured by DIC Corporation, the "IMPRANIL" series manufactured by Bayer AG, the "SOFLANATE" series manufactured by Nippon Soflan the "POIZ" series manufactured by Kao Corporation, the "SANPRENE" series manufactured by Sanyo Chemical Industries, Ltd., the "IZELAX" series manufactured by Hodogaya Chemical CO., LTD., and the "NEOREZ" series manufactured by Zeneca Group PLC.

It is possible to form an aqueous resin layer as a primer layer by coating the surface of a substrate with the aqueous resin composition and drying the aqueous resin composition.

As the coating method, a known coating method such as a dipping method, a spin coating method, and a spray method can be used. The coating conditions may be appropriately set so as to form a primer layer having a desired film thickness. Before coating, the polarizing film surface of the surface to be coated can also be subjected to a chemical treatment using an acid, an alkali, various kinds of organic solvents, or the like, a physical treatment using plasma, ultraviolet light, ozone, or the like, and a detergent treatment using various kinds of detergents. By conducting such a pretreatment, it is possible to improve the adhesive property.

After coating with the aqueous resin composition, an aqueous resin layer can be formed as a primer layer by drying the composition. The drying can be conducted, for example, by placing the member on which the primer layer is formed in an atmosphere of from room temperature to 100° C. for from 5 minutes to 24 hours.

(Interference Fringe Suppressing Layer)

Embodiments may further include an interference fringe suppressing layer between the lens substrate and the hard coat layer.

The interference fringe suppressing layer may have an optical film thickness of from $0.2\lambda$ to $0.3\lambda$ in the light having a wavelength $\lambda$ of from 450 to 650 nm in order to suppress the interference fringe.

The interference fringe suppressing layer is obtained, for example, by coating with a dispersion containing at least inorganic oxide particles and a resin.

The inorganic oxide particles are used from the viewpoint of adjusting the refractive index of the interference fringe suppressing layer, and examples thereof may include particles of tungsten oxide ($WO_3$), zinc oxide (ZnO), silicon oxide ($SiO_2$), aluminum oxide ($Al_2O_3$), titanium oxide ($TiO_2$), zirconium oxide ($ZrO_2$), tin oxide ($SnO_2$), beryllium oxide (BeO), antimony oxide ($Sb_2O_5$), and the like, and the inorganic oxide particles may be used singly or two or more kinds thereof may be concurrently used. In addition, it is also possible to use composite oxide particles of two or more kinds of inorganic oxides. The particle size of the inorganic oxide particles may be in a range of from 5 to 30 nm from the viewpoint of optical properties.

Examples of the resin of the interference fringe suppressing layer may include at least one kind selected from a polyurethane resin, an acrylic resin, or an epoxy resin, and preferably the resin is a polyurethane resin and more preferably it is an aqueous resin composition containing a polyurethane resin, namely, an aqueous polyurethane resin composition. Examples of the aqueous polyurethane resin composition may include the resins exemplified in the primer layer.

The dispersion may contain an aqueous solvent. The aqueous solvent is, for example, water or a mixed solvent of water and a polar solvent or the like, and preferably it is water. The solid concentration in the aqueous resin composition may be from 1 to 60% by mass and may be from 5 to 40% by mass from the viewpoint of liquid stability and film-forming property. The aqueous resin composition can also contain additives such as an antioxidant, a dispersant, and a plasticizer if necessary in addition to the resin component. In addition, a commercially available aqueous resin composition may be used by being diluted with a solvent such as water, an alcohol, or propylene glycol monomethyl ether (PGM).

(Antireflection Layer)

The antireflection layer may be provided on the hard coat layer. The antireflection layer, for example, has a configuration in which a low refractive index layer and a high refractive index layer are alternately disposed. The antireflection layer may have from 4 to 10 layers and may have from 5 to 8 layers.

The refractive index of the low refractive index layer may be from 1.35 to 1.80 and may be from 1.45 to 1.50 at a wavelength of from 500 to 550 nm. The low refractive index layer is formed of an inorganic oxide, and may be formed of $SiO_2$.

The refractive index of the high refractive index layer may be from 1.90 to 2.60 and may be from 2.00 to 2.40 at a wavelength of from 500 to 550 nm.

The high refractive index layer is, for example, formed of an inorganic oxide. The inorganic oxide used in the high refractive index layer is preferably at least one kind of inorganic oxide selected from $ZrO_2$, $Ta_2O_5$, $Y_2O_3$, $TiO_2$, $Nb_2O_5$, and $Al_2O_3$ and may be $Nb_2O_5$, $ZrO_2$ or $Ta_2O_5$.

The spectacle lens of the present disclosure may have a hard coat layer and other functional layers only on the surface of the lens substrate or on the rear surface thereof as well. The spectacle lens may be a plastic lens for spectacle in which the lens substrate is a plastic.

EXAMPLES

Hereinafter, the present disclosure will be described in more detail with reference to Examples, but the present disclosure is not limited to these Examples. Incidentally, the evaluation of the plastic lenses obtained in Examples and Comparative Examples were carried out as follows.

[Average Film Thickness of Hard Coat Layer]

The average film thickness of the hard coat layer was measured by using a lens substrate on which the hard coat layer was formed and a non-contact type film thickness measuring apparatus (non-contact film thickness measuring instrument FF 8 manufactured by SystemRoad co., Ltd.) by the optical Interference Method.

[Diamond Scratch Test (DS Test)]

A diamond stylus having a tip curvature radius of 50 μm was installed to a continuous load type surface measuring machine (Type 22 manufactured by Shinto Scientific Co., ltd.), the spectacle lens and the diamond stylus were linearly relatively moved at a velocity of 10 mm/sec while gradually increasing the contact load between them at 1 g/sec to form scratches. The load was determined from the position at which the scratches started to be visually recognized under a fluorescent lamp and adopted as the "scratch generating load", and the scratches were observed under a microscope, and the load was determined from the position at which the surface film of the spectacle lens started to be cut and adopted as the "film peeling off load".

Incidentally, the color of the scratches to be formed is in a state indicating white as the surface film is cut. In this manner, scratches conspicuous even with a naked eye are formed when the surface film is cut.

[Initial Crack]

A plastic lens which was subjected to the thermal curing step and on which the primer layer and the hard coat layer were formed was visually observed to evaluate the generation of cracks.

Evaluation Criteria

A almost no cracks are generated.

B cracks are slightly generated.

C cracks are apparently generated.

[Hot Water Test]

The plastic lens thus fabricated was immersed in hot water at 50° C. for 24 hours and air dried. Thereafter, the adhesive property of the lens was evaluated by the following method.

Cuts having a length of 10 mm were crosscut on the coat film by the primer layer, hard coat layer, and antireflection layer of the plastic lens described above on the basis of JIS K5600-5-6 (ISO 2409:1992).

The pressure-sensitive adhesive tape (CELLOTAPE (registered trademark) manufactured by NICHIBAN CO., LTD.) was strongly attached to this crosscut place and the pressure-sensitive adhesive tape was then rapidly detached therefrom, and the number of peeled off square meshes among the 100 meshes on the cured film was then examined. The evaluation criteria are as follows.

Evaluation Criteria

A number of peeled off square meshes of 0 to 2/100

B number of peeled off square meshes of 3 to 5/100

C number of peeled off square meshes of 6/100 or less

[QUV Test]

Cuts having a length of 10 mm were crosscut on the coat film by the primer layer, hard coat layer, and antireflection layer of the plastic lens described above on the basis of JIS K5600-5-6 (ISO 2409:1992).

The adhesion test was conducted by using a QUV tester. The conditions for the exposure treatment in the adhesion test method were that one cycle was constituted by illuminance 0.20×45° C.×4 hours and dew condensation 45° C.×4 hours and 21 cycles were repeated for 168 hours in total. The evaluation method was as follows.

The pressure-sensitive adhesive tape (CELLOTAPE (registered trademark) manufactured by NICHIBAN CO., LTD.) was strongly attached to the crosscut place of the sample after this treatment and the pressure-sensitive adhesive tape was then rapidly detached therefrom, and the presence or absence of film peeling off of the substrate meshes after the pressure-sensitive adhesive tape was peeled off was examined.

Evaluation Criteria

A number of peeled off square meshes of 0 to 2/100
B number of peeled off square meshes of 3 to 5/100
C number of peeled off square meshes of 6/100 or less Example 1

The primer liquid was applied on the resin substrate (plastic lens, trade name: EYNOA manufactured by HOYA CORPORATION, refractive index: 1.67) by a dipping method and dried and solidified for 20 minutes at 100° C. to form a primer layer on both surfaces of the lens substrate, the hard coat liquid constituted by the following components was applied thereon by a spray method and dried for 20 minutes at 100° C. to solidify the hard coat layer. On the sample surface subjected to this hard coat, a silicon oxide layer of the first ground layer (low refractive index layer) was formed by a vacuum deposition method, and a zirconium oxide layer and a silicon oxide layer were alternately laminated thereon as the second layer to the seventh layer, thereby forming the antireflection film (AR layer, AR 1).

Examples 2 to 5 and Comparative Examples 1 to 5

The plastic lenses were obtained in the same manner as in Example 1 except that the configurations of the primer layer, the hard coat layer, and the AR layer were as those presented in the following tables. The plastic lenses thus obtained were evaluated, and the results thereof are presented in the following tables. However, the hard coat liquid was applied by a dipping method only in Comparative Example 5.

(Primer Liquid)

PR1: one prepared by diluting an aqueous polyurethane resin composition (EVAFANOL HA-170 manufactured by NICCA CHEMICAL CO., LTD) 6-fold with propylene glycol monomethyl ether was used.

(Component of Hard Coat Liquid)

[Organosilicon Compound]

KBM403: γ-glycidoxypropyltrimethoxysilane (trade name: KBM403 manufactured by Shin-Etsu Chemical Co., Ltd.)

[Polyfunctional Epoxy Compound]

EX-321: trimethylolpropane polyglycidyl ether (number of glycidyl group functional groups: bi- to tri-functional, trade name: EX-321 manufactured by Nagase ChemteX Corporation)

[Inorganic Oxide]

PGM-ST: $SiO_2$ sol (tradename: PGM-ST manufactured by NISSAN CHEMICAL INDUSTRIES, LTD.)

MeOH silica sol: $SiO_2$ sol (trade name: MeOH silica sol manufactured by NISSAN CHEMICAL INDUSTRIES, LTD.)

[Others]

Leveling material: surfactant (trade name: Y7006 manufactured by Dow Corning Toray)

Aluminum-based catalyst: aluminum tris(acetylacetonate) (trade name: aluminum chelate A (W) manufactured by Kawaken Fine Chemicals Co., Ltd.)

Diluting solvent: methanol, PGM, 4-hydroxy-4-methyl-2-pentanone (DAA), water, and hydrogen chloride solution (Antireflection Film)

AR1: low refractive index material ($SiO_2$) and high refractive index material ($ZrO_2$)

AR2: low refractive index material ($SiO_2$) and high refractive index material ($Ta_2O_5$)

AR3: low refractive index material ($SiO_2$) and high refractive index material ($Nb_2O_5$)

Representation of the substrate in the table is as follows.

167: plastic lens for spectacle, trade name: EYNOA manufactured by HOYA CORPORATION, refractive index: 1.67

TABLE 1

| Kind of hard coat liquid | Inorganic oxide | | Silane coupling agent | | Polyfunctional epoxy compound | | Leveling agent | Aluminum-based catalyst |
|---|---|---|---|---|---|---|---|---|
| | Kind | Amount | Kind | Amount | Kind | Amount | | |
| HC1 | PGM-ST + MeOH silica sol | 27 + 55 | KBM403 | 16 | EX321 | 11 | 1 | 2.5 |
| HC2 | PGM-ST + MeOH silica sol | 29 + 57 | KBM403 | 12 | EX321 | 13 | 1 | 2.5 |
| HC3 | PGM-ST + MeOH silica sol | 19 + 37 | KBM403 | 56 | EX321 | — | 1 | 2.0 |
| HC4 | PGM-ST + MeOH silica sol | 23 + 47 | KBM403 | 30 | EX321 | 5 | 1 | 2.0 |
| HC5 | PGM-ST + MeOH silica sol | 23 + 47 | KBM403 | 26 | EX321 | 8 | 1 | 2.0 |
| HC6 | PGM-ST + MeOH silica sol | 23 + 47 | KBM403 | 23 | EX321 | 11 | 1 | 2.8 |

TABLE 1-continued

| Kind of hard coat liquid | Mass of solid (parts by mass) | | | Amount of polyfunctional epoxy compound in matrix component (% by mass) |
|---|---|---|---|---|
| | Inorganic oxide | Silane coupling agent | Polyfunctional epoxy compound | |
| HC1 | 25 | 11 | 11 | 50 |
| HC2 | 26 | 9 | 13 | 60 |
| HC3 | 17 | 40 | — | 0 |
| HC4 | 21 | 21 | 5 | 20 |
| HC5 | 21 | 19 | 8 | 30 |
| HC6 | 21 | 16 | 11 | 40 |

TABLE 2

| | Substrate | Primer layer | | Hard coat layer | | AR layer |
|---|---|---|---|---|---|---|
| | | Kind | Film thickness [μm] | Kind | Ratio of epoxy*1 | Film thickness [μm] | Kind of AR |

| | Substrate | Kind | Film thickness [μm] | Kind | Ratio of epoxy*1 | Film thickness [μm] | Kind of AR |
|---|---|---|---|---|---|---|---|
| Example 1 | 167 | PR1 | 1.6 | HC1 | 50 | 20 | AR1 |
| Example 2 | 167 | PR1 | 1.6 | HC2 | 60 | 20 | AR1 |
| Example 3 | 167 | PR1 | 1.8 | HC1 | 50 | 10 | AR2 |
| Example 4 | 167 | PR1 | 1.8 | HC1 | 50 | 20 | AR2 |
| Example 5 | 167 | PR1 | 1.8 | HC1 | 50 | 50 | AR2 |
| Comparative Example 1 | 167 | PR1 | 1.8 | HC3 | 0 | 20 | AR1 |
| Comparative Example 2 | 167 | PR1 | 1.6 | HC4 | 20 | 20 | AR1 |
| Comparative Example 3 | 167 | PR1 | 1.6 | HC5 | 30 | 20 | AR1 |
| Comparative Example 4 | 167 | PR1 | 1.6 | HC6 | 40 | 20 | AR1 |
| Comparative Example 5 | 167 | PR1 | 1 | HC3 | 0 | 3 | AR3 |

*1Amount of polyfunctional epoxy compound in matrix component (% by mass)

TABLE 3

| | Spectacle lens | | | DS test | | Weather resistance test | | |
|---|---|---|---|---|---|---|---|---|
| | | Hard coat layer | | Scratch generating load [gf] | Film peeling off load [gf] | Initial crack | QUV | Hot water |
| | Substrate | Ratio of epoxy*1 | Film thickness [μm] | | | | | |
| Comparative Example 1 | 167 | 0 | 20 | 100 | 390 | C | A | A |
| Comparative Example 2 | 167 | 20 | 20 | 120 | 241 | C | A | A |
| Comparative Example 3 | 167 | 30 | 20 | 120 | 298 | C | A | A |
| Comparative Example 4 | 167 | 40 | 20 | 120 | 296 | B | A | A |
| Example 1 | 167 | 50 | 20 | 120 | 263 | A | A | A |
| Example 2 | 167 | 60 | 20 | 120 | 295 | A | A | A |
| Example 3 | 167 | 50 | 10 | 85 | 185 | A | A | A |
| Example 4 | 167 | 50 | 20 | 100 | 265 | A | A | A |
| Example 5 | 167 | 50 | 50 | 60 | 387 | A | A | A |
| Comparative Example 5 | 167 | 0 | 3 | 30 | 74 | A | C | C |

*1Amount of polyfunctional epoxy compound in matrix component (% by mass)

It can be seen that a high film peeling off load and excellent scratch resistance are obtained as the film thickness of the hard coat layer is in a predetermined range when the results for Examples are compared with those for Comparative Examples. Additionally, it can be seen that a hard coat liquid which can suppress the initial cracks is obtained as the ratio of an epoxy group in the hard coat liquid is within a predetermined range. In addition, it can be seen that a hard coat layer exhibiting excellent weather resistance is obtained as the ratio of an epoxy group in the hard coat liquid is within a predetermined range.

The invention claimed is:
1. A spectacle lens comprising:
   a lens substrate; and
   a hard coat layer obtained by curing a curable composition containing inorganic oxide particles, a silane coupling agent, and a polyfunctional epoxy compound, a content of the polyfunctional epoxy compound in a matrix component of the curable composition being between 45% and 60% by mass.
2. The spectacle lens according to claim 1, wherein the hard coat layer has a film thickness between 10 μm and 50 μm.
3. The spectacle lens according to claim 2, wherein the inorganic oxide particles are silica particles.
4. The spectacle lens according to claim 3, wherein the silane coupling agent has an organic group bonded to a silicon atom and an alkoxy group bonded to a silicon atom.

5. The spectacle lens according to claim 4, wherein the polyfunctional epoxy compound has two or three epoxy groups.

6. The spectacle lens according to claim 5, further comprising an interference fringe suppressing layer between the lens substrate and the hard coat layer.

7. The spectacle lens according to claim 1, wherein the inorganic oxide particles are silica particles.

8. The spectacle lens according to claim 1, wherein the silane coupling agent has an organic group bonded to a silicon atom and an alkoxy group bonded to a silicon atom.

9. The spectacle lens according to claim 1, wherein the polyfunctional epoxy compound has two or three epoxy groups.

10. The spectacle lens according to claim 1, further comprising an interference fringe suppressing layer between the lens substrate and the hard coat layer.

11. The spectacle lens according to claim 2, wherein the silane coupling agent has an organic group bonded to a silicon atom and an alkoxy group bonded to a silicon atom.

12. The spectacle lens according to claim 2, wherein the polyfunctional epoxy compound has two or three epoxy groups.

13. The spectacle lens according to claim 2, further comprising an interference fringe suppressing layer between the lens substrate and the hard coat layer.

14. The spectacle lens according to claim 3, wherein the polyfunctional epoxy compound has two or three epoxy groups.

15. The spectacle lens according to claim 3, further comprising an interference fringe suppressing layer between the lens substrate and the hard coat layer.

16. The spectacle lens according to claim 4, further comprising an interference fringe suppressing layer between the lens substrate and the hard coat layer.

17. The spectacle lens according to claim 1, wherein the hard coat layer has a film thickness of 15 μm or more and 40 μm or less.

18. The spectacle lens according to claim 1, wherein the hard coat layer has a film thickness of 18 μm or more and 30 μm or less.

19. A spectacle lens comprising:

a lens substrate; and a hard coat layer, the hard coat layer comprising inorganic oxide particles in a cured matrix component, the matrix component containing a silane coupling agent and a polyfunctional epoxy compound, a content of the polyfunctional epoxy compound in the matrix component being between 45% and 60% by mass.

20. A method of providing a spectacle lens, the method comprising:

coating a lens substrate with a curable composition; and curing the coated curable composition to obtain a hard coat layer, wherein the hard coat layer comprises inorganic oxide particles in a cured matrix component, and wherein the matrix component contains a silane coupling agent and a polyfunctional epoxy compound, a content of the polyfunctional epoxy compound in the matrix component being between 45% and 60% by mass.

* * * * *